(12) United States Patent
Hayashida

(10) Patent No.: US 9,789,389 B2
(45) Date of Patent: Oct. 17, 2017

(54) EMULATOR USING ANALYSIS OF DISPLAYED IMAGE TO DETERMINE EXECUTION STATUS

(71) Applicant: NINTENDO CO., LTD., Kyoto (JP)

(72) Inventor: Koichi Hayashida, Kyoto (JP)

(73) Assignee: NINTENDO CO., LTD., Kyoto (JP)

(*) Notice: Subject to any disclaimer, the term of this patent is extended or adjusted under 35 U.S.C. 154(b) by 859 days.

(21) Appl. No.: 14/138,884

(22) Filed: Dec. 23, 2013

(65) Prior Publication Data

US 2015/0080133 A1 Mar. 19, 2015

(30) Foreign Application Priority Data

Sep. 18, 2013 (JP) ................. 2013-193420

(51) Int. Cl.
  *G06F 3/0482* (2013.01)
  *A63F 13/00* (2014.01)
  (Continued)

(52) U.S. Cl.
  CPC ............ *A63F 13/00* (2013.01); *A63F 13/10* (2013.01); *A63F 13/795* (2014.09); *A63F 13/86* (2014.09);
  (Continued)

(58) Field of Classification Search
  None
  See application file for complete search history.

(56) References Cited

U.S. PATENT DOCUMENTS

| 5,112,051 A * | 5/1992 | Darling .................. A63F 13/02 463/45 |
| 2001/0031665 A1* | 10/2001 | Taho ....................... A63F 13/10 463/43 |

(Continued)

FOREIGN PATENT DOCUMENTS

| GB | 2 365 361 | 2/2002 |
| JP | 2001-340640 | 12/2001 |

(Continued)

OTHER PUBLICATIONS

Wikipedia "Action Replay", Aug. 8, 2013, XP002736751, Retrieved from the Internet on Mar. 4, 2015 (7 pgs.).

(Continued)

*Primary Examiner* — Lawrence Galka
(74) *Attorney, Agent, or Firm* — Nixon & Vanderhye P.C.

(57) ABSTRACT

An example recording medium records an information processing program causing an information processing apparatus to operate as: a reading part reading a game program capable of being executed by any other information processing apparatus having a configuration different from that of the information processing apparatus and execution situation information indicating an execution situation at a given execution position of the game program; an emulation part, by using the execution situation information, emulating the game program with starting at the given execution position; a judgment part judging an execution situation of the game program to be emulated; and a changing part, when it is judged that the execution situation of the game program satisfies a condition set forth in advance, changing an execution status of the emulation part.

14 Claims, 15 Drawing Sheets

(51) Int. Cl.
*A63F 13/40* (2014.01)
*A63F 13/86* (2014.01)
*A63F 13/87* (2014.01)
*A63F 13/795* (2014.01)

(52) U.S. Cl.
CPC ........ *A63F 13/87* (2014.09); *A63F 2300/209* (2013.01)

(56) References Cited

U.S. PATENT DOCUMENTS

| | | |
|---|---|---|
| 2008/0045338 A1 | 2/2008 | Walker et al. |
| 2009/0011838 A1 | 1/2009 | Miyamoto |
| 2013/0172086 A1* | 7/2013 | Ikenaga .................. A63F 13/10 463/43 |
| 2013/0198334 A1* | 8/2013 | Ikenaga .................. A63F 13/10 709/217 |
| 2014/0317566 A1* | 10/2014 | Ohara ....................... G06F 8/38 715/810 |

FOREIGN PATENT DOCUMENTS

| | | | |
|---|---|---|---|
| JP | 2001-340655 | 12/2001 | |
| JP | 2009-011569 | 1/2009 | |
| WO | WO-2013/065350 A1 * | 5/2013 | ............... G06F 8/38 |

OTHER PUBLICATIONS

Olaf Boehm and Joerg Zauner: "Amiga Action Replay III", Jan. 1, 1991, XP002584361, Retrieved from the Internet, (63 pgs.).

* cited by examiner

FIG. 6A    FIG. 6B    FIG. 6C

FIG. 6A:
- t: NUMBER OF TIMES OF APPEARANCE
- c1: SEARCH REGION
- c2: JUDGMENT-USE IMAGE
- c4: NUMBER OF TIMES
- c5: APPEARANCE POSITION x1,y1 x2,y2

FIG. 6B:
- t: NUMBER OF APPEARING EVENTS
- c1: SEARCH REGION
- c2: JUDGMENT-USE IMAGE
- c6: NUMBER OF PIECES

FIG. 6C:
- t: COUNTER
- c1: SEARCH REGION
- c2: JUDGMENT-USE IMAGE
- c7: VALUE
- c8: INEQUALITY SIGN

F I G. 8
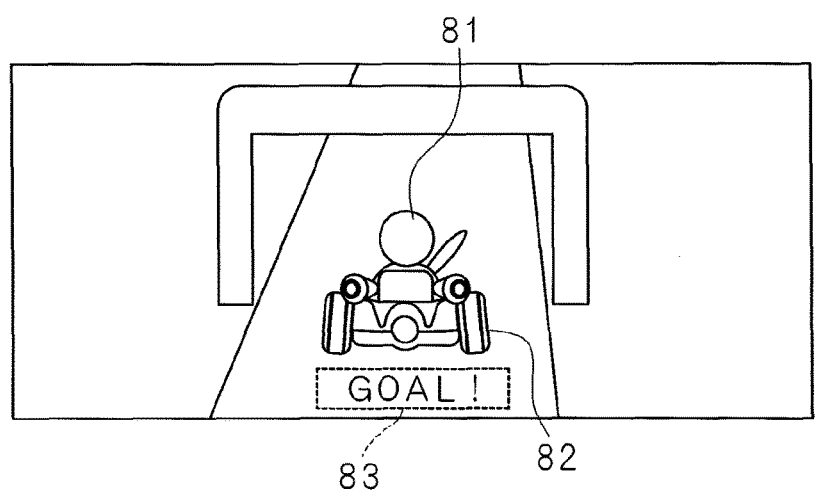

F I G. 1 0
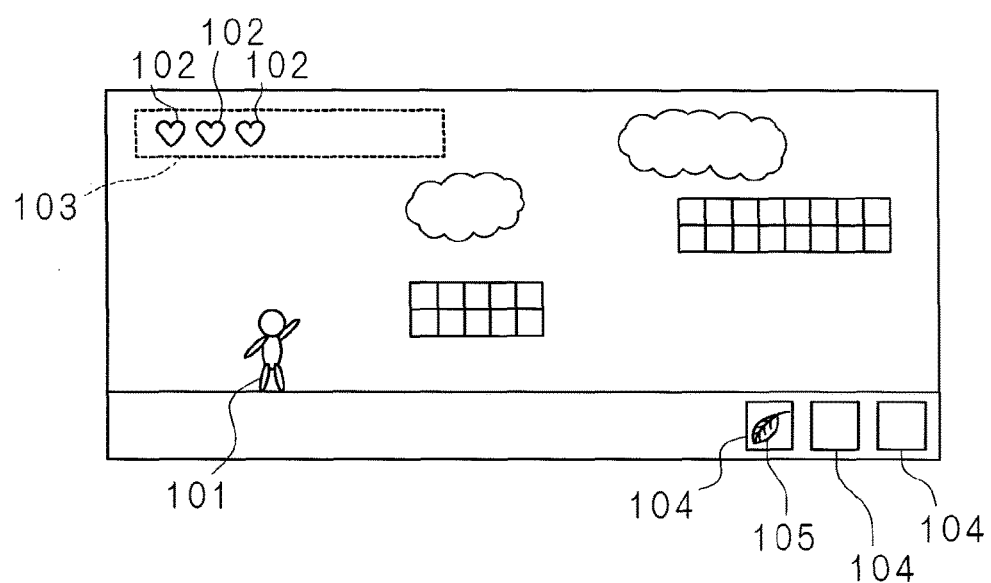

EMULATOR USING ANALYSIS OF DISPLAYED IMAGE TO DETERMINE EXECUTION STATUS

CROSS-REFERENCE TO RELATED APPLICATIONS

This application is based upon and claims the benefit of priority of the prior Japanese Patent Application No. 2013-193420, filed on Sep. 18, 2013, the entire contents of which are incorporated herein by reference.

FIELD

The technology herein relates to a recording medium, an information processing apparatus, an information processing system, and an information processing method for emulating a game program.

BACKGROUND AND SUMMARY

With the progress of computer technology in recent years, the processing speeds and the performance of CPUs (Central Processing Units) are increasing. In association with this, game machines employing such new CPUs have been developed. Such game machines of new types have different configurations from old type machines. Thus, game programs for old type machines are not allowed to run on new-type machines. Accordingly, an emulator has been proposed for allowing game programs for game machines of old types to run on game machines of new types.

According to an aspect of the embodiment, a recording medium records an information processing program causing an information processing apparatus to operate as: a reading part reading a game program capable of being executed by any other information processing apparatus having a configuration different from that of the information processing apparatus and execution situation information indicating an execution situation at a given execution position of the game program; an emulation part, by using the execution situation information, emulating the game program with starting at the given execution position; a judgment part judging an execution situation of the game program to be emulated; and a changing part, when it is judged that the execution situation of the game program satisfies a condition set forth in advance, changing an execution status of the emulation part.

The object and advantages of the invention will be realized and attained by means of the elements and combinations particularly pointed out in the claims. It is to be understood that both the foregoing general description and the following detailed description are exemplary and explanatory and are not restrictive of the invention.

These and other objects, features, aspects and advantages of the present technology will become more apparent by the following detailed explanation in reference to the accompanying drawings.

BRIEF DESCRIPTION OF THE DRAWINGS

FIGS. 6A to 6C show explanation diagrams each illustrating a data structure of a clearing condition of each condition type.

FIG. 8 shows an explanation diagram for a situation that a player character has crossed the goal line in a racing game.

FIG. 10 shows an explanation diagram for a case that in various games, a change in a player stock number of a player character is detected.

DETAILED DESCRIPTION OF NON-LIMITING EXAMPLE EMBODIMENTS

Figure 1:
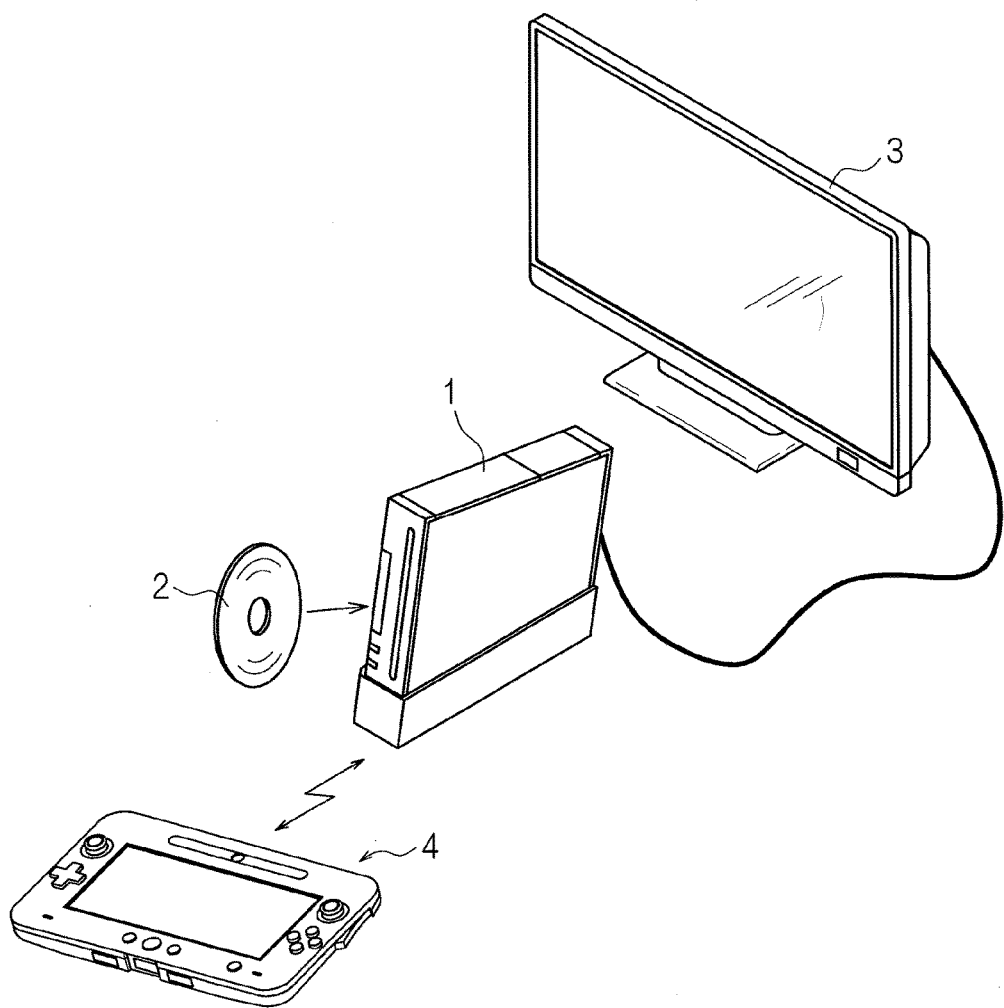
FIG. 1 shows an explanation diagram illustrating a configuration of a game system according to the embodiment.

FIG. 1 shows an explanation diagram illustrating the configuration of a game system (an information processing system) according to the present embodiment. The game system includes a game machine 1 (an information processing apparatus), a recording medium 2, a display 3 such as a television receiver, and a controller 4. The game machine 1 reads and executes information processing programs stored in the recording medium 2 or the like so as to perform game processing. In the present embodiment, these information processing programs include a management program, an emulation program, and a game program. Further, the game processing indicates processing performed by the game program.

The game machine 1 is connected to the display 3 through a connecting cable. The display 3 displays a game image obtained in the game processing executed by the game machine 1. Further, the display 3 includes a speaker. Then, the speaker outputs game sound obtained as a result of game processing.

The controller 4 is an operation device used by a user. The controller 4 performs communication with the game machine 1, for example, by using a short-distance wireless communication technique such as Bluetooth (registered trademark). The controller 4 receives operation input performed by a player through a cross key, an analog stick, push buttons, a touch panel, or the like and then transmits such operation information to the game machine 1. Further, the controller 4 may include a display part, a speaker, and a microphone. Then, the controller 4 may display the image displayed on the display 3 or alternatively may display an image different from that displayed on the display 3. As for sound, similarly, the same sound as that outputted from the built-in speaker of the display 3 may be outputted from the speaker of the controller 4 or alternatively dedicated sound for the controller 4 may be outputted. The microphone collects sound in the surrounding of the controller 4 such as utterance sound of the player or the like, and then transmits the sound data to the game machine 1.

Figure 2:
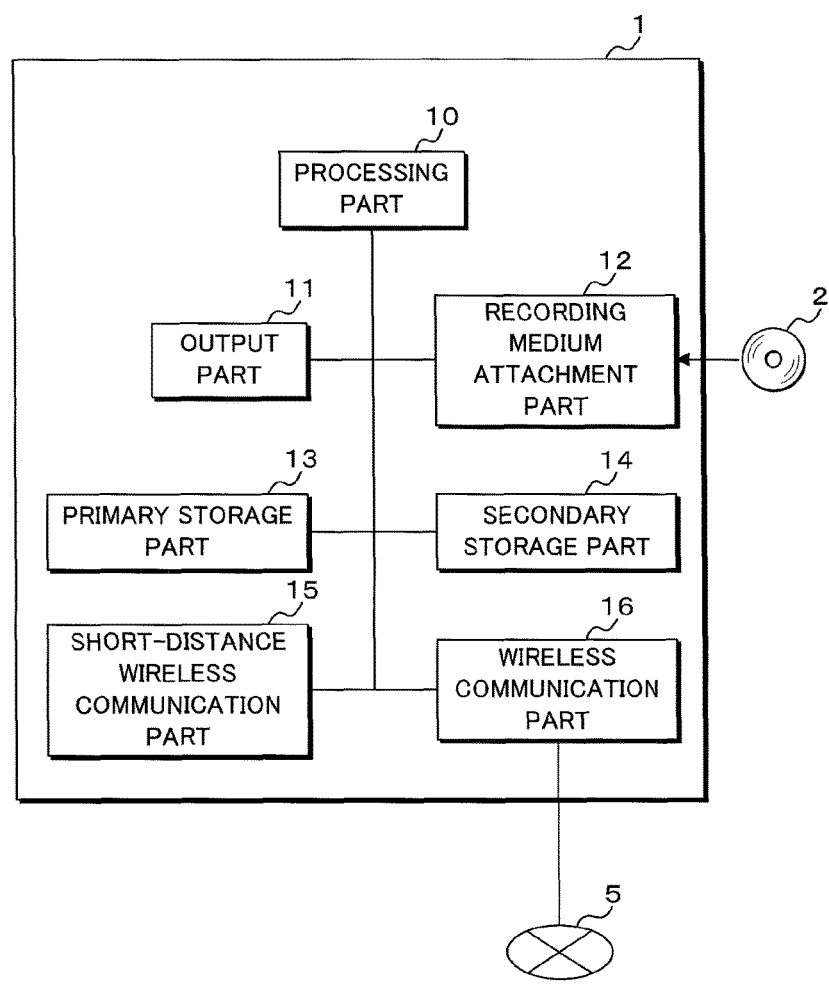
FIG. 2 shows a block diagram illustrating a hardware configuration of a game machine according to the embodiment.

FIG. 2 shows a block diagram illustrating the hardware configuration of the game machine 1 according to the present embodiment. The game machine 1 includes a processing part 10, an output part 11, a recording medium attachment part 12, a primary storage part 13, a secondary storage part 14, a short-distance wireless communication part 15, and a wireless communication part 16.

The processing part 10 of the game machine 1 is constructed from an arithmetic processing unit such as a CPU (Central Processing Unit). The processing part 10 reads a management program P1, an emulation program P2, and a game program P3 (which are described later) stored in the secondary storage part 14, then loads the programs onto the primary storage part 13, and then executes the programs so as to perform game processing. All or a part of the management program P1, the emulation program P2, and the game program P3 may be read from the recording medium 2 attached to the recording medium attachment part 12.

The output part 11 outputs the image and the sound provided from the processing part 10 so that the image is displayed on the display 3 and the sound is outputted through the speaker built in the display 3. The recording medium attachment part 12 is constructed such that the recording medium 2 such as a DVD (Digital Versatile Disc) and a CD-ROM (Compact Disc Read Only Memory) is allowed to be attached thereto and detached therefrom. Here, the recording medium attachment part 12 may be constructed such that a cassette used in conventional game machines is allowed to be attached. Then, the game program P3 and the like may be read from the cassette. The primary storage part 13 is constructed from a semiconductor memory device or the like. The primary storage part 13 temporarily stores various kinds of data generated in association with the arithmetic processing of the processing part 10. The secondary storage part 14 is constructed from a nonvolatile storage device having a larger capacity than the primary storage part 13. The secondary storage part 14 stores the game program P3 and other data or the like.

As described above, the short-distance wireless communication part 15 performs communication with the controller 4. That is, the short-distance wireless communication part 15 receives from the controller 4 the operation input and the sound data collected through the microphone, and then outputs these kinds of data to the processing part 10. Further, the short-distance wireless communication part 15 transmits to the controller 4 the image or the sound inputted from the processing part 10 or the output part 11.

The wireless communication part 16 transmits and receives information to and from a server apparatus or the like through a network 5 such as a wireless LAN (Local Area Network) or a portable telephone network. For example, the game machine 1 performs communication with the server apparatus through the wireless communication part 16 so as to download the game program P3 and then stores the program into the secondary storage part 14. Similarly, the management program P1, the emulation program P2, and the like may be downloaded from the server apparatus.

Figure 3:
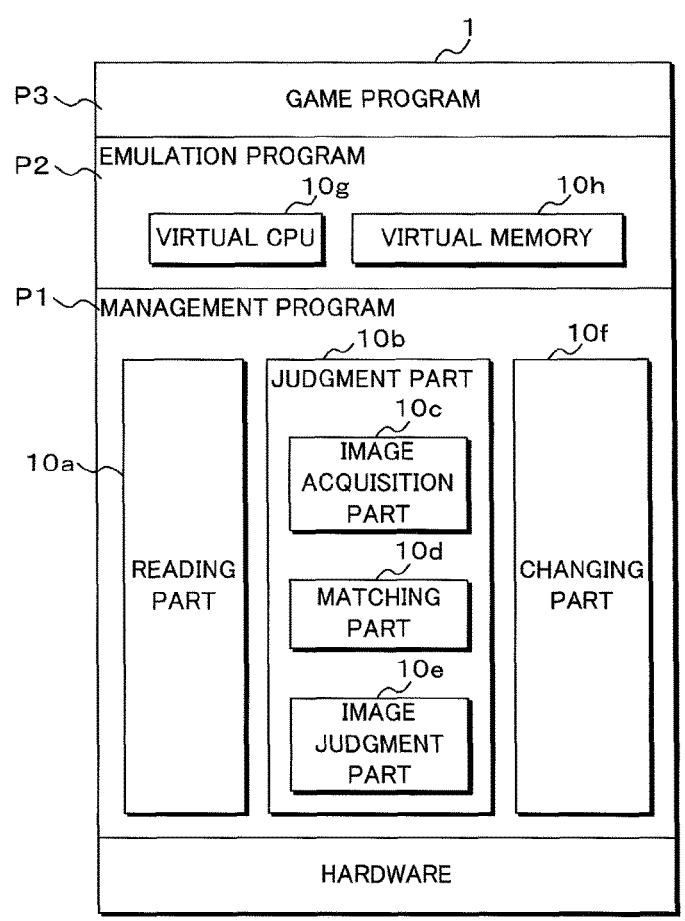
FIG. 3 shows an explanation diagram illustrating relation between hardware and software of a game machine according to the embodiment.

FIG. 3 shows an explanation diagram illustrating relation between the hardware and the software of the game machine 1 according to the present embodiment. The management program P1 is executed on the hardware of the game machine 1. Then, an emulator operates on the management program P1. Further, the game program P3 operates on the emulator.

The emulator (an emulation execution part) emulates the hardware of any other game machine having a different hardware configuration from the game machine 1. The emulator includes a virtual CPU 10$g$ and a virtual memory 10$h$. The emulator permits operation of a game program whose operation is intrinsically allowed only in other game machines. For example, the term "other game machines" indicates game machines of a former generation.

The management program P1 includes as functional parts a reading part 10$a$, a judgment part 10$b$, and a changing part 10$f$. The reading part 10$a$ reads execution situation information necessary for the operation of the emulator.

The judgment part 10$b$ monitors the execution status of the game program operating on the emulator and thereby judges whether the execution status satisfies a condition set forth in advance.

In the present embodiment, the judgment part 10$b$ performs judgment on the basis of the displayed contents of the game image displayed on the display 3. The judgment part 10$b$ includes an image acquisition part 10$c$, a matching part 10$d$, and an image judgment part 10$e$. The image acquisition part 10$c$ acquires a game image. The matching part 10$d$ performs matching between the image acquired by the image acquisition part 10$c$ and a judgment-use image acquired in advance. From the matching result obtained by the matching part 10$d$, the image judgment part 10$e$ judges whether the game image satisfies a condition set forth in advance.

When the judgment part 10$b$ has detected that the execution status satisfies the condition set forth in advance, the changing part 10$f$ changes the execution status of the game program under execution on the emulator. For example, execution of the game program under execution is stopped and then execution is restarted at an execution position set forth in advance. Alternatively, another game program is read and then the program is executed with starting at a given execution position.

In the game machine 1, the processing part 10 executes the management program P1 so that the reading part 10$a$, the judgment part 10$b$, and the changing part 10$f$ are implemented as software-based functional means.

The game machine according to the present embodiment is allowed to perform partial execution of the game program. Here, the partial execution indicates that the game program is executed partly. In the partial execution, a part of one game program may be executed once or alternatively in plural times. Further, mutually different parts of one program may be executed once each or each in plural times. Further, partial execution of a plurality of programs may be combined. An execution flow is employed in order to implement such partial execution. The execution flow describes the order of execution of the game program, the execution position of the game program in each execution, and the condition for stopping the executed game program, and the like.

Figure 4:
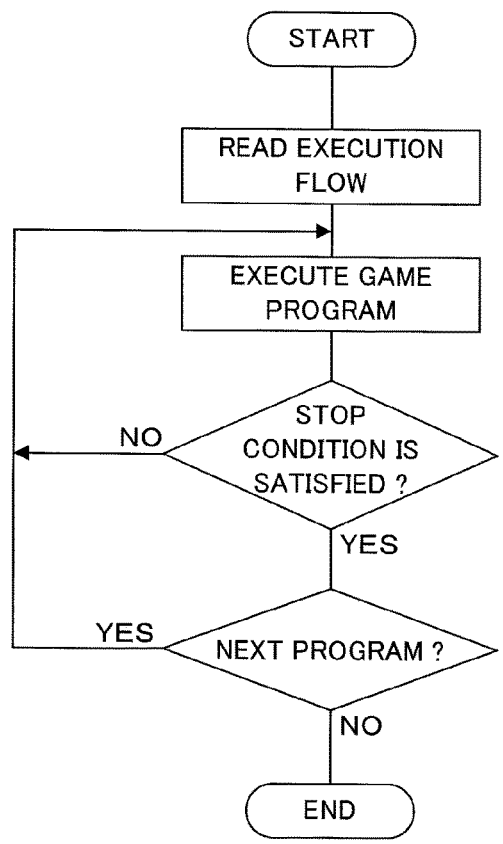
FIG. 4 shows a flow chart illustrating outlines of processing performed by a game machine.

FIG. 4 shows a flow chart illustrating the outlines of the processing performed by the game machine. First, the game machine reads an execution flow and then, in accordance with the read-out execution flow, executes the game program. The game machine monitors the execution status of the game program and thereby judges whether the execution status satisfies the stop condition. When the execution status does not satisfy the stop condition, the game machine continues execution of the game program. When the execution status satisfies the stop condition, the game machine refers to the execution flow so as to judge whether any game program is to be executed next. When a program is to be executed next, the game machine executes this next game program. When no program is to be executed next, the game machine terminates the processing.

Figure 5:
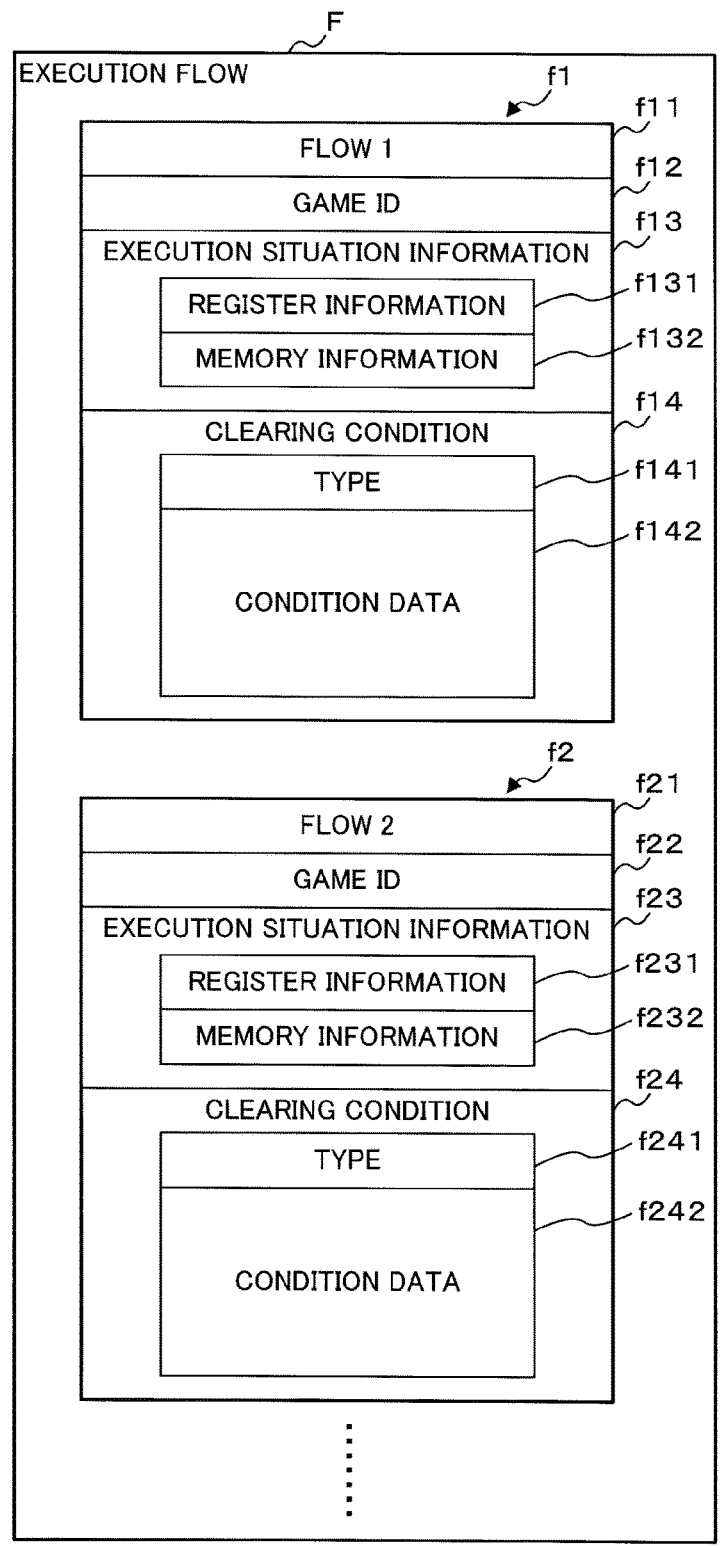
FIG. 5 shows an explanation diagram illustrating a data structure of an execution flow.

Next, various kinds of data used in the present embodiment is described below. FIG. 5 shows an explanation diagram illustrating the data structure of an execution flow F. The execution flow F defines the procedure of execution of a game program. The execution flow F is composed of a plurality of flows consisting of a flow f1, a flow f2, . . . Each of f11 and f21 in FIG. 5 stores an ID of the flow. Then, the flows are executed in the order of the numerical value contained in each ID. The data structure of each flow is described below with adopting the flow f1 as an example. The flow f1 contains a game ID f12, execution situation information f13, and a clearing condition f14. The game ID f12 is information used for identifying a game.

The execution situation information f13 is information used for starting at a given position the execution of the game program corresponding to the game identified by the game ID f12. The execution situation information f13 contains register information f131 and memory information f132 at a given position in the course of game program execution. When the register information f131 and the memory information f132 are used, the state at the given position is allowed to be reproduced and then the game program is allowed to be executed with starting at the given position in place of the beginning of the program. The execution situation information f13 may contain information such as a stack, a flag register, an interrupt vector, and the timer value of an interval timer or the like.

As described above, the execution situation information f13 indicates the register information f131, the memory information f132, and the like in a situation that the game program has been stopped at a given position. That is, the execution situation information f13 is static information also referred to as a so-called snapshot.

In contrast, the execution status indicates the state during the operation of the game program and hence is dynamic information premised to vary continuously. When plural pieces of the execution situation information f13 are aligned in time series, the newest one is the execution status.

In the present embodiment, the execution situation information f13 is information representing the situation in the middle of the game. For example, in a game containing a plurality of scenes, when the situation of the beginning of a third scene is prepared as the execution situation information f13, the player is allowed to start the game at the beginning of the third scene as if the player has cleared the first scene and the second scene even if has not actually cleared the first scene and the second scene. Further, when the execution situation information f13 is acquired in the middle of the scene, the game is allowed to be started even at the middle of the scene. For example, in the last scene, when the execution situation information f13 is acquired in a situation that the conditions necessary for appearance of a boss character have been satisfied, the player is allowed to fight with the boss character without the necessity of clearing other scenes.

The clearing condition f14 defines a condition (a stop condition) for stopping the game program. When the clearing condition f14 is used, operation of the game program is allowed to be stopped at an arbitrary time point. That is, the game is allowed to be cleared on the basis of a condition different from the intrinsic one of the game program. In the example of the flow f11 in FIG. 5, the clearing condition f14 contains a condition type f141 and condition data f142. The condition data f142 has a different content for each condition type.

Here, the stop condition is not limited to the clearing condition f14 for clearing the game and may be a condition for judgment of game over.

Next, the clearing condition f14 is described below. The flowing description is given for a case that condition judgment is performed in a situation that the image (referred to as a "game image", hereinafter) outputted and displayed by the game program is adopted as an example of the clearing condition f14. FIGS. 6A to 6C show explanation diagrams each illustrating the data structure of the clearing condition f14 of each condition type. FIGS. 6A to 6C illustrate three condition types. FIG. 6A illustrates the clearing condition f14 for the case of "number of times of appearance" type. In this condition, it is judged that the condition is satisfied when a given image has appeared in the game image in plural times. In this case, the clearing condition f14 contains a search region c1, a judgment-use image c2, the number of times c4, and an appearance position c5. The search region c1 defines a region to be adopted as a processing target in the game image. The judgment-use image c2 is an image used for extracting an image used for judging the clearing condition f14. The number of times c4 is the number of times of appearance that satisfies the clearing condition. The appearance position c5 defines a position where a given image is to appear. The number of times of appearance is counted when the given image is displayed within a fixed region relative to the defined position. In a case that any position within the search region is allowed, the appearance position c5 may be not defined. Further, in a case that positions in a number corresponding to the number of times are defined, the condition may be defined as including a case that plural times of appearance occur at mutually different positions.

FIG. 6B illustrates the clearing condition f14 for the case of "number of appearing events" type. In this condition, it is judged that the condition is satisfied when a plurality of given images simultaneously appear in the game image. In this case, the clearing condition contains a search region c1, a judgment-use image c2, and the number of pieces c6. The search region c1 and the judgment-use image c2 are similar to the above-mentioned ones. The number of pieces c6 is the number of given images that satisfy the clearing condition.

FIG. 6C illustrates the clearing condition f14 for the case of "counter" type. In this condition, a numerical value that appears in the game image is extracted and then it is judged whether the condition relation is satisfied depending on the magnitude relation of the value relative to a threshold. In this case, the clearing condition f14 contains a search region c1, a judgment-use image c2, a value c7, and an inequality sign c8. The search region c1 is similar to the above-mentioned one. The judgment-use image c2 is also similar to the above-mentioned one. However, since an image representing a numeric character need be extracted, at least nine images representing 0 to 9 are set forth. The value c7 is the threshold serving as the reference of condition judgment. The inequality sign c8 indicates the relation between the numerical value on the screen and the threshold when the condition is to be satisfied. In a case that the inequality sign c8 is a greater-than symbol ">", it is judged that the condition is satisfied when the numerical value on the screen is greater than the threshold.

Figure 7A:
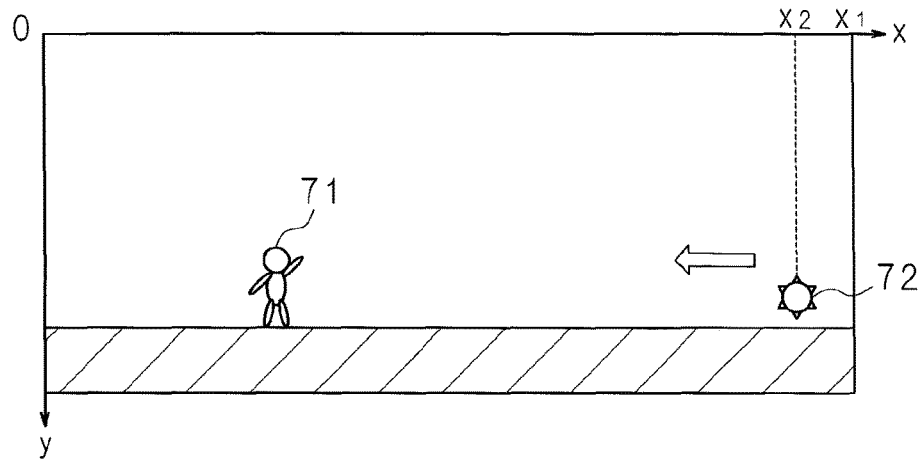
FIGS. 7A to 7C show explanation diagrams for a situation that a player character eludes an enemy character.
Figure 7B:
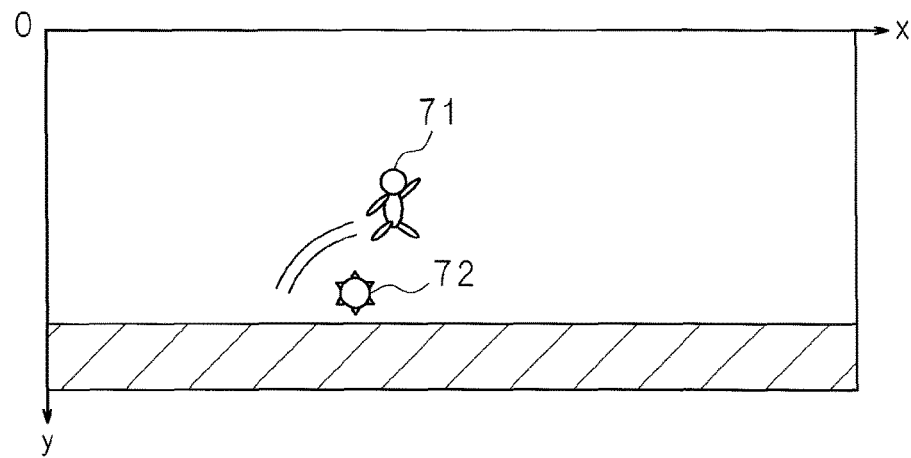
Figure 7C:
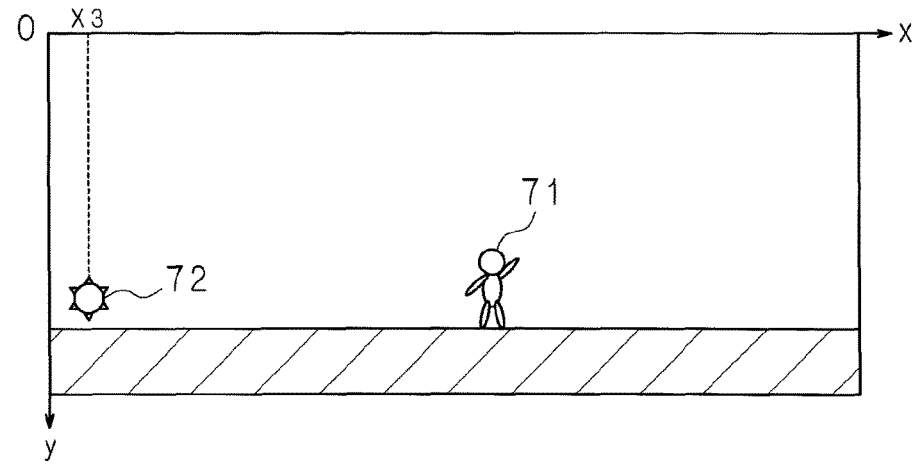

Next, a detailed example of the clearing condition f14 is described below. FIGS. 7A to 7C show explanation diagrams for a situation that a player character 71 eludes an enemy character 72. That is, when the player character 71 has eluded the enemy character 72, the game is concluded as being cleared. As illustrated in FIG. 7A, the enemy character 72 appears from the right side of the screen. Then, as illustrated in FIG. 7B, the player character 71 jumps so as to elude the enemy character 72. Then, as illustrated in FIG. 7C, the enemy character disappears in the left side of the screen. In this case, the image in which the enemy character 72 has appeared and the image in which the enemy character 72 is disappearing are recognized.

In FIGS. 7A to 7C, the upper left corner of the image is the origin O. The left-right axis is the x-axis and the up-down axis is the y-axis. The x-coordinate of the right end of the screen is denoted by x1. The x-coordinate of the enemy character 72 located at the right end is denoted by x2 and the x-coordinate of the enemy character 72 at the left end is denoted by x3.

In this case, in a case that the enemy character 72 appears near x2, then moves to x3, and then becomes no longer displayed, it is allowed to judge that the player character 71 has eluded the enemy character 72. Thus, for example, the clearing condition f14 is set up as follows.

Type t: number of times of appearance
Search region c1: entire screen
Judgment-use image c2: enemy character image
Number of times c4: 2
Appearance position c5: x=x2 and y=arbitrary at first time; x=x3 and y=arbitrary at second time Here, a width is not set forth for the coordinates of the appearance position c5. However, a width may be set forth when the position is judged. The y-coordinate has been "arbitrary". However, in a case that the corresponding enemy character 72 does not move up and down, the y-coordinate may be specified.

Further, for the purpose of more accurately detecting the motion of the enemy character 72, the number of times c4 may be increased.

When a condition similar to the above-mentioned one is set up, detection is allowed for a situation that the player character having started at the start has reached the goal and a situation that the player character having started at the start has fulfilled any task and then returned to the start.

Further, in a racing game, in a case that shortcut of the course is allowed, when a characteristic image contained in the background image at a point where shortcut is allowed and a characteristic image contained in the background image at a point where shortcut has been succeeded are adopted as the judgment-use images, a situation that shortcut has been succeeded is allowed to be detected.

FIG. 8 shows an explanation diagram for a situation that a player character 81 has crossed the goal line in a racing game. A cart 82 driven by the player character 81 has crossed the goal line and hence a message "GOAL!" is displayed on the screen. When this message is detected, it is allowed to detect a situation that the player character 81 has crossed the goal line.

In this case, for example, the clearing condition f14 is set up as follows.

Type t: number of times of appearance
Search region c1: given region
Judgment-use image c2: message image of "GOAL!"
Number of times c4: 1
Appearance position c5: arbitrary In the above-mentioned case, the display position of the message is premised to be fixed and hence the search region is set to be the "given region" for the purpose of reduction in the amount of processing. Instead, in a case that the position where the message image is displayed varies depending on the scene and hence setting in advance is difficult, it is sufficient that the search region is set to be the entire screen.

When a condition similar to the above-mentioned one is set up, it is allowed to detect a message image such as "Clear!" in a case that the scene has been cleared and a message such as "Win!" in a case that the opponent character has been defeated in a fighting game.

Further, in a case that a special pose taken by the player character is detected, it is allowed to detect a situation of having crossed the goal line or having defeated the enemy character.

Further, in a case that an effect image displayed when the enemy character has been defeated is detected, it is allowed to detect a situation that the player character has defeated the enemy character.

Figure 9A:
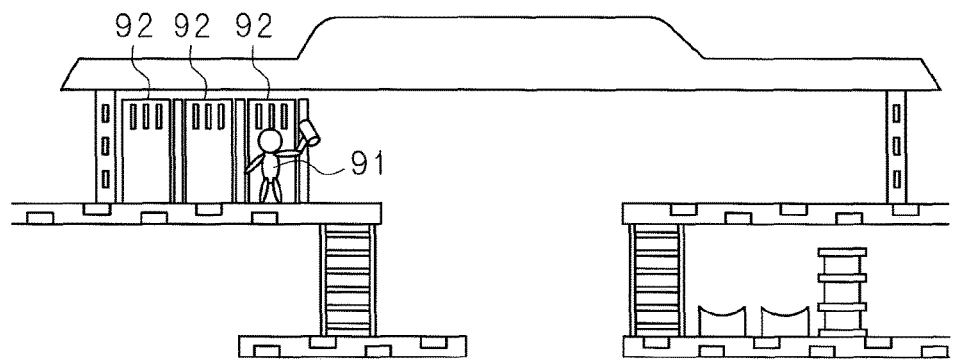
FIGS. 9A and 9B show explanation diagrams for a case that in various games, a clearing condition is set as that a predetermined number of walls are destroyed.
Figure 9B:
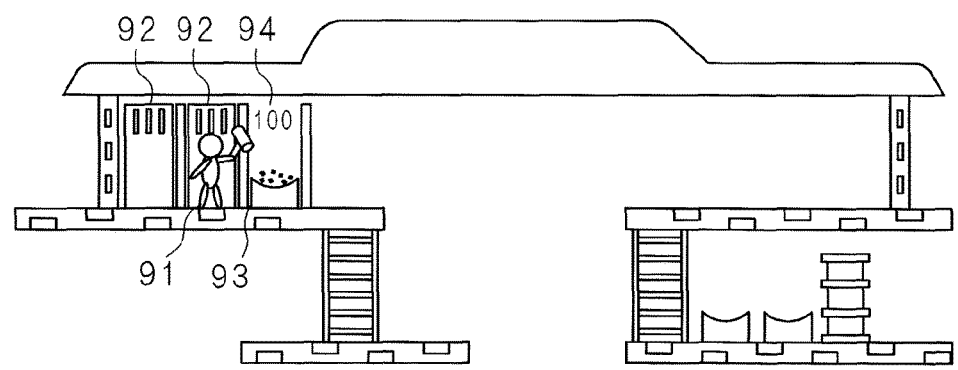

FIGS. 9A and 9B show explanation diagrams for a case that in various games, a clearing condition is set as that a predetermined number of walls are destroyed. FIG. 9A illustrates a situation that a wall is not yet destroyed and the player character 91 is trying to destroy the wall 92. FIG. 9B illustrates a situation immediately after the wall has been destroyed. Thus, a destroyed wall 93 is displayed. A point 94 obtained by the destruction is displayed above the destroyed wall 93. In the example of FIG. 9B, the obtained point 94 is 100 points. When the player character 91 has destroyed a predetermined number of walls, clearing is concluded.

In this case, for example, the clearing condition f14 is set up as follows.

Type t: number of times of appearance
Search region c1: entire image
Judgment-use image c2: image immediately after destruction of wall
Number of times c4: predetermined number
Appearance position c5: arbitrary When a condition similar to the above-mentioned one is set up, also a condition that clearance is concluded when a predetermined number of walls have been destroyed is allowed to be set up. Further, a condition that clearing is concluded when a predetermined number of enemy characters have been defeated is similarly set up.

FIG. 10 shows an explanation diagram for a case that in various games, a change in the player stock number of the player character is detected. In the example illustrated in FIG. 10, the player stock number of the player character 101 is indicated as the number of displayed icons 102 in a region 103 in the upper left part of the screen. Since three icons 102 are displayed, the player stock number is 3. Here, clearing is concluded when the player stock number is increased by one so that the player stock number becomes 4.

In this case, for example, the clearing condition f14 is set up as follows.

Type t: number of appearing events
Search region c1: given region (region 103 in FIG. 10)
Judgment-use image c2: icon image indicating player stock (image of icons 102 in FIG. 10)
Number of pieces c6: number of pieces at which clearing is concluded (4 in this example)

Here, in the above-mentioned example, the player stock number necessary for clearing has been 4. However, when the player stock number at beginning is indefinite, it is sufficient that the player stock number is acquired at beginning and then increment by one in the player stock number is detected. In such a case, it is sufficient that setting of the number of pieces is expressed by "+1" or the like with sign so that distinction from the above-mentioned case is achieved.

Further, also a case that clearing is concluded when the player character 101 has acquired an item may be treated similarly to the above-mentioned case. Three item display areas 104 are displayed in the lower right part of the screen in FIG. 10. The leftmost item display area 104 displays an item 105. This indicates that the player character 101 has acquired the item 105. For example, a condition that clearing is concluded when the item 105 has been acquired with starting in a state that no item is acquired is set up as follows.

Type t: number of appearing events

Search region c1: given region (all item display areas 104 in example of FIG. 10)

Judgment-use image c2: icon image of target item (image of item 105 in FIG. 10)

Number of pieces c6: number of pieces regarded as being acquired (1 in FIG. 10)

Here, in a case that clearing is to be concluded when an arbitrary item has been acquired rather than when a particular item has been acquired, it is sufficient that the judgment-use image c2 is set to be the number of all items.

Figure 11:
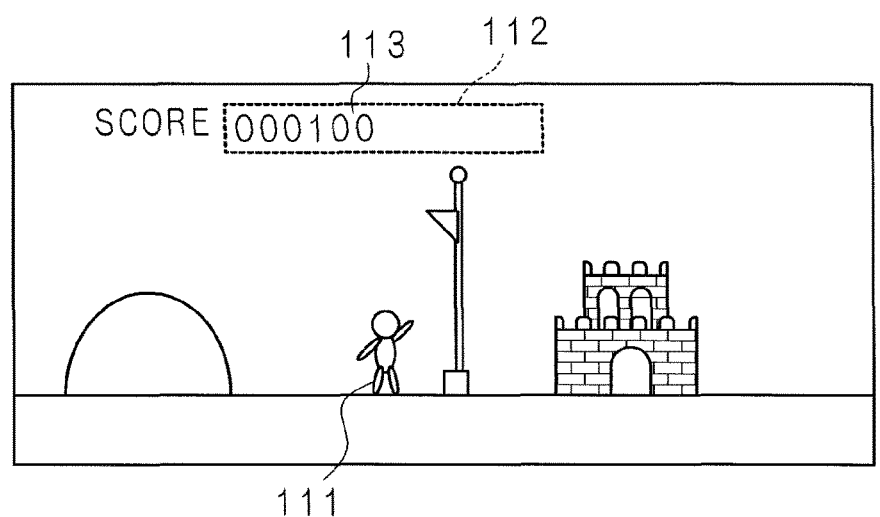
FIG. 11 shows an explanation diagram illustrating a case that clearing is concluded when a score reaches a given value.

FIG. 11 shows an explanation diagram illustrating a case that clearing is concluded when a score reaches a given value. A score 113 is displayed in a given region 112 on the screen. In the example of FIG. 11, the score 113 is 100 points. Here, for example, a condition that clearing is concluded when the score 113 reaches 150 points is set up as follows.

Type t: counter

Search region c1: given region (region 112 in FIG. 11)

Judgment-use image c2: image indicating numeric character (images from "0" to "9")

Value c7: value at which increase or decrease is concluded (150 in FIG. 11)

Inequality sign c8: >, <, and the like (= or ≥ in FIG. 11)

Here, in a case that a change in the player stock number is detected, when display of the player stock number is performed not by the number of icons, condition setting is achieved by setting similar to the above-mentioned one. Also in a case that the clearing condition is set as that a predetermined number of floors or walls are destroyed, when screen display of the number of destructions is performed by using a numeric character, condition setting is achieved by setting similar to the above-mentioned one.

Further, the judgment-use image has been premised to be an image of any character from "0" to "9". However, in a case that the value for the score, the player stock number, or the number of destructions used for the clearing condition is a fixed value, an image alone that displays the fixed value may be adopted as the judgment-use image. Then, it is sufficient that the condition type t is set to be "number of times of appearance" and the number of times c4 is set to be 1.

As described above, the clearing condition f14 of diverse kind is allowed to be set up. Thus, the game is allowed to be cleared in response to the clearing condition f14 different from the original condition of the game program. For example, such situations are allowed that clearing is concluded when merely one out has been made in a baseball game and that clearing is concluded when shortcut of the course has been succeeded in a racing game.

Figure 12:
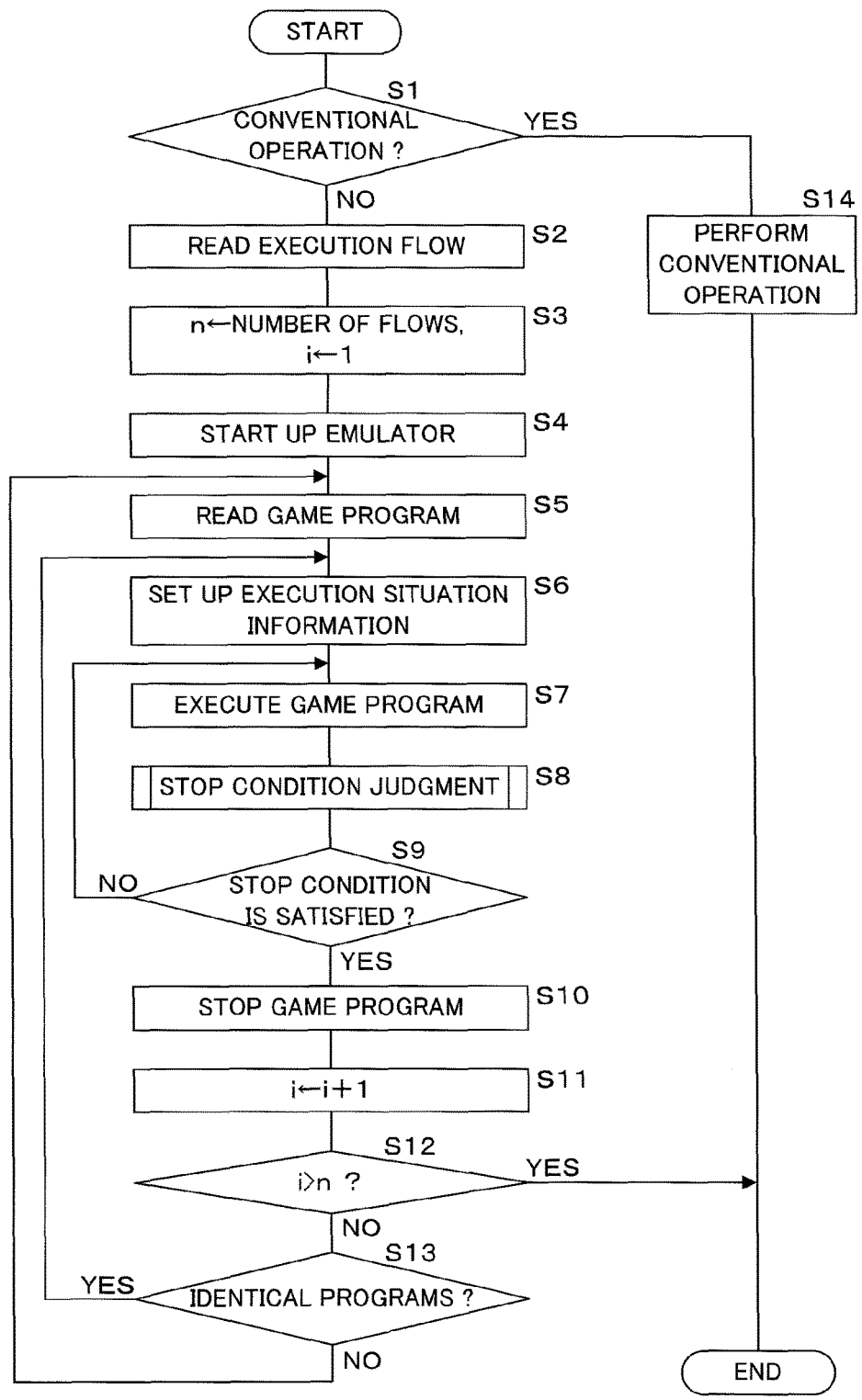
FIG. 12 shows a flow chart used for describing processing performed by a game machine according to the embodiment.

Next, the processing performed by the game machine 1 according to the present embodiment is described below. FIG. 12 shows a flow chart used for describing the processing performed by the game machine 1 according to the present embodiment. After starting up the game machine 1, the player selects a function to be executed through a menu screen or the like. On the basis of the selected function, the processing part 10 of the game machine 1 judges whether the conventional operation is to be performed (step S1). The conventional operation mentioned here indicates the operation of providing the function of a game machine of conventional art.

When conventional operation has not been instructed (NO at step S1), the processing part 10 (the reading part 10a) reads an execution flow from the secondary storage part 14 (step S2). The processing part 10 sets the number of flows contained in the execution flow into a variable n and then sets a loop counter i to be 1 (step S3).

Then, the processing part 10 starts up the emulator (step S4), that is, starts up the emulation program P2 stored in the secondary storage part 14. The processing part 10 executes the emulation program P2 so as to serve as an emulation part.

Then, the processing part 10 (the reading part 10a) reads the i-th flow from the execution flow and then reads the specified game program from the secondary storage part 14 (step S5). The processing part 10 sets up execution situation information (step S6). The processing part 10 sets various kinds of register values and memory states contained in the execution situation information, individually into the registers and the memories of the emulator.

Then, the processing part 10 executes the game program on the emulator (step S7). The processing part 10 (the judgment part 10b) judges the stop condition (step S8).

Figure 13:
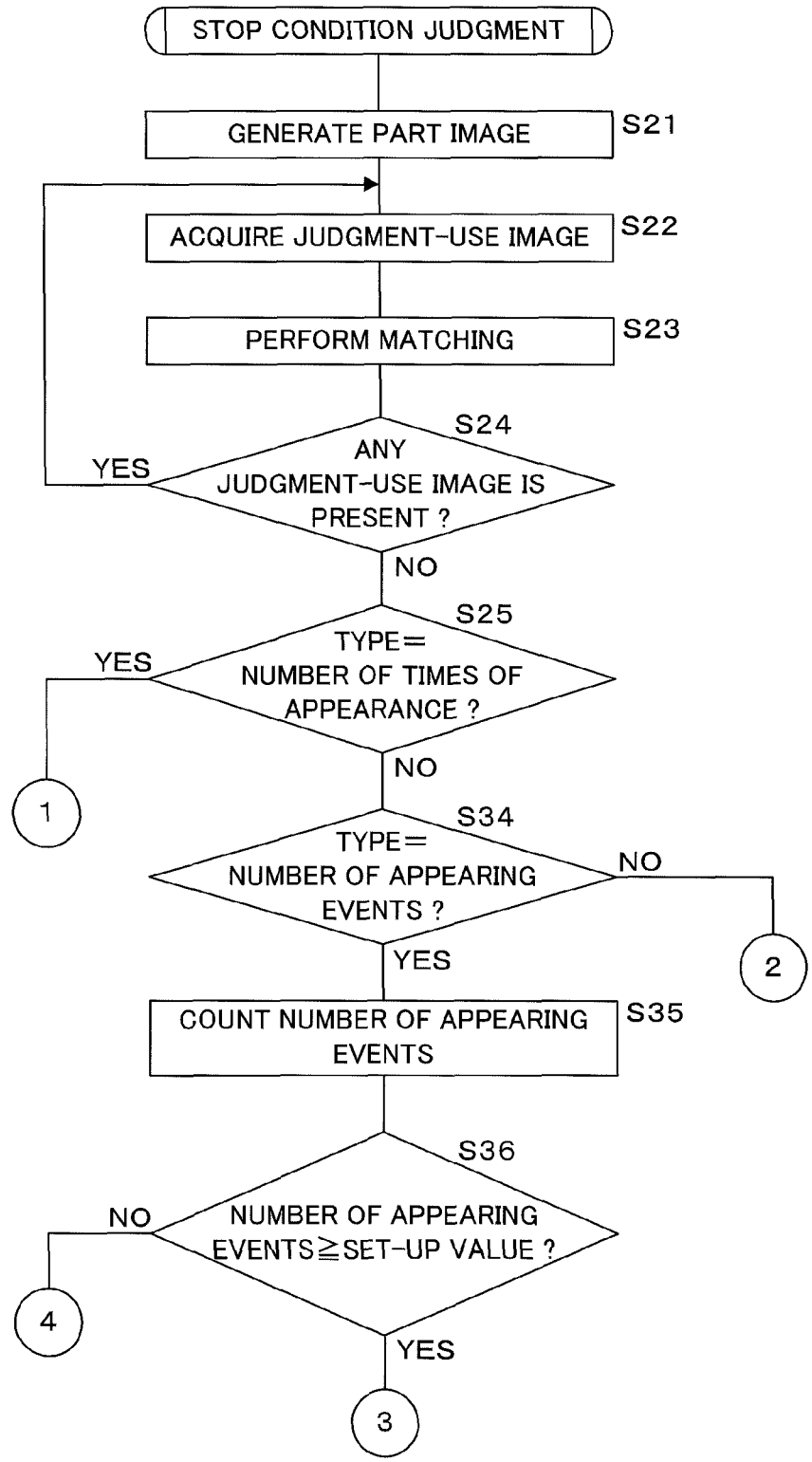
FIG. 13 shows a flow chart illustrating a processing procedure of stop condition judgment processing.
Figure 14:
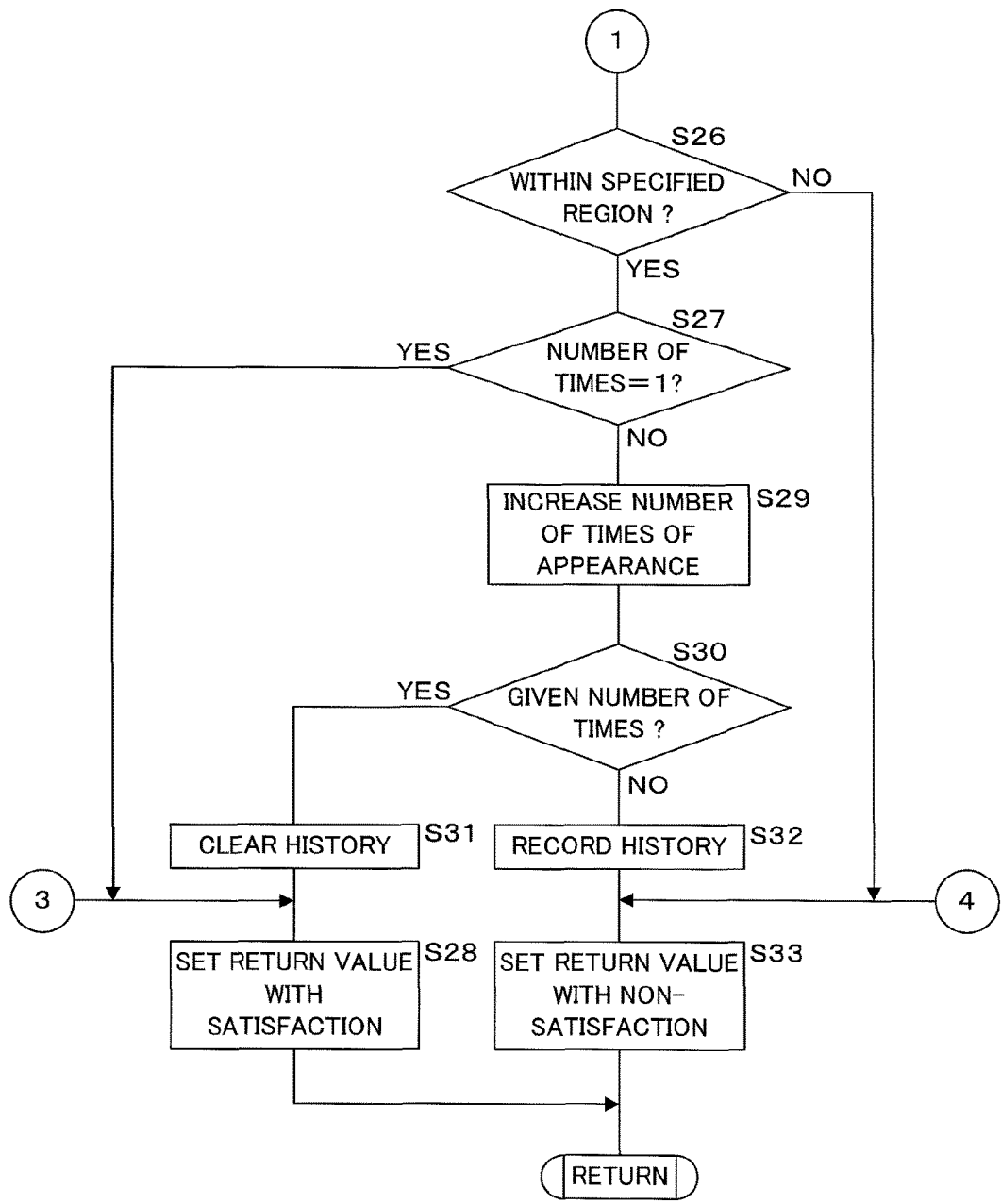
FIG. 14 shows a flow chart illustrating a processing procedure of stop condition judgment processing.
Figure 15:
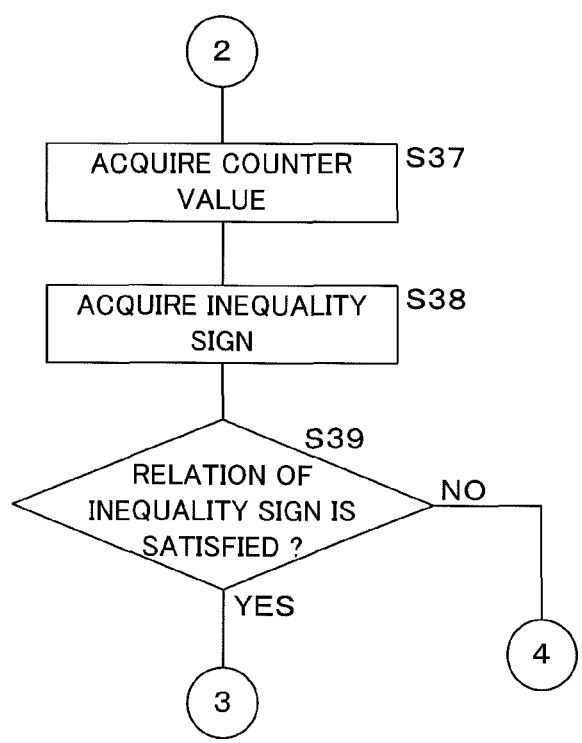
FIG. 15 shows a flow chart illustrating a processing procedure of stop condition judgment processing.

FIGS. 13 to 15 show flow charts each illustrating a processing procedure of the stop condition judgment processing. The processing part 10 acquires the clearing condition of the i-th flow which is a flow under execution, and further acquires the search region contained in the clearing condition. On the basis of the acquired search region, from the output image of the game program, the processing part 10 (the image acquisition part 10c) generates a part image used for matching (step S21). The output image is stored in the primary storage part 13. Then, the processing part 10 acquires the judgment-use image contained in the clearing condition (step S22). The processing part 10 (the matching part 10d) performs matching between the part image and the judgment-use image (step S23). The processing part 10 judges whether any judgment-use image has not yet undergone matching (step S24). In the case of presence of a judgment-use image having not yet undergone matching (YES at step S24), the processing part 10 returns the processing to step S22. In the case of absence of a judgment-use image having not yet undergone matching (NO at step S24), the processing part 10 (the image judgment part 10e) acquires the condition type of the clearing condition and then judges whether the condition type is "number of times of appearance" (step S25). When the condition type is "number of times of appearance" (YES at step S25), the flow chart goes to FIG. 14. Then, the processing part 10 judges whether the appearance position of the matching image falls within a specified region (step S26). That is, the processing part 10 judges whether a matching image appears within the search region and further the matching image is located within the given region including the appearance position described in the clearing condition. When the matching image is located within the specified region (YES at step S26), the processing part 10 judges whether the number of times in the clearing condition is 1 (step S27). When the number of times is 1 (YES at step S27), the processing part 10 sets the return value to be a value indicating satisfaction of the condition (step S28) and then returns the processing to the call source.

When the number of times in the clearing condition is not 1 (NO at step S27), the processing part 10 increases the number of times of appearance stored in the primary storage part 13 or the like (step S29). The processing part 10 judges whether the number of times of appearance has reached a given number of times specified in the clearing condition (step S30). When the given number of times has reached (YES at step S30), the processing part 10 clears the history of matching including the number of times of appearance stored in the primary storage part 13 or the like (step S31). The processing part 10 sets the return value to be a value indicating satisfaction of the condition (step S28) and then returns the processing to the call source.

When the given number of times has not yet reached (NO at step S30), in a case that the history of matching is already stored in the secondary storage part 14 or the like, the processing part 10 updates the history of matching. In the case of absence of the history of matching, the processing part 10 newly generates and records a history containing the number of times of appearance (step S32). In addition to the number of times of appearance, the history may contain the appearance position of the matching image, a time stamp such as the present time, and the like.

Then, the processing part 10 sets the return value to be a value indicating non-satisfaction of the condition (step S33) and then returns the processing to the call source.

When the matching image is not located within the specified region (NO at step S26), the processing part 10 sets the return value to be a value indicating non-satisfaction of the condition (step S33) and then returns the processing to the call source.

In FIG. 13, when the condition type is not "number of times of appearance" (NO at step S25), the processing part 10 judges whether the condition type is "number of appearing events" (step S34). When the condition type is "number of appearing events" (YES at step S34), on the basis of the matching result, the processing part 10 counts the number of appearing events of the judgment-use image (step S35). The processing part 10 judges whether the number of appearing events is greater than or equal to the value set up in the clearing condition (step S36). When the number of appearing events is greater than or equal to the set-up value (YES at step S36), the flow chart goes to FIG. 14 so that the processing part 10 sets the return value to be a value indicating satisfaction of the condition (step S28) and then returns the processing to the call source. Returning to FIG. 13, when the number of appearing events is smaller than the set-up value (NO at step S36), the flow chart goes to FIG. 14 so that the processing part 10 sets the return value to be a value indicating non-satisfaction of the condition (step S33) and then returns the processing to the call source.

In FIG. 13, when the condition type is not "number of appearing events" (NO at step S34), the flow chart goes to FIG. 15. In this case, the condition type is "counter" which is the remaining one. From the matching result, the processing part 10 acquires the target counter value (step S37). The processing part 10 acquires the inequality sign set up in the clearing condition (step S38). The processing part 10 judges whether the counter value and the threshold c7 set up in the clearing condition 14 satisfy the relation indicated by the acquired inequality sign (step S39). For example, when the inequality sign is a greater-than symbol ">", the processing part 10 judges whether the counter value is greater than the threshold c7. When the relation indicated by the inequality is satisfied (YES at step S39), the processing part 10 sets the return value to be a value indicating satisfaction of the condition (step S28) and then returns the processing to the call source. When the relation indicated by the inequality is not satisfied (NO at step S39), the processing part 10 sets the return value to be a value indicating non-satisfaction of the condition (step S33) and then returns the processing to the call source.

Here, the processing part 10 may include a DSP (Digital Signal Processor) or a GPU (Graphics Processing Unit) capable of performing image processing at high speeds. Then, the processing from the generation of the part image (step S21) to the matching (step S23) may be performed by the DSP or the GPU.

Further, in the matching processing described above, when the search region has been specified, the part image used for matching has been generated from the output image. However, the generation of the part image is not indispensable. That is, it is sufficient that matching with the judgment-use image is performed within the search region.

Returning to FIG. 12, on the basis of the return value of the stop condition judgment processing, the processing part 10 judges whether the judgment result satisfies the stop condition (step S9). When the stop condition is not satisfied (NO at step S9), the processing part 10 returns the processing to step S7. When the stop condition is satisfied (YES at step S9), the processing part 10 (the changing part 100 changes the execution status of the game program under execution on the emulator, from execution into stop (step S10). The processing part 10 increments the loop counter by one (step S11). The processing part 10 judges whether the value in the loop counter i is greater than the number n of flows (step S12). When the value in the loop counter i is not greater than the number n of flows (NO at step S12), the processing part 10 judges whether the game program specified by the i-th flow is identical to the program whose execution is stopped (step S13). When the programs are identical to each other (YES at step S13), the processing part 10 returns the processing to step S6. When the programs are not identical to each other (NO at step S13), the processing part 10 returns the processing to step S5.

When the value in the loop counter i is greater than the number n of flows (YES at step S12), the processing has been completed for all flows contained in the execution flow and hence the processing part 10 terminates the processing. Further, at step S1, in a case that the operation has been judged to be conventional one (YES at step S1), the processing part 10 performs conventional operation (step S14) and then terminates the processing.

As described above, the game machine 1 according to the present embodiment reads the register state of the CPU and the contents of the memory in the middle of operation of a game program. This permits the game program to be operated with starting in the middle. Further, whether the clearing condition set forth in advance has been satisfied is detected and then the execution status of the game program is changed. Thus, even when the game program under execution does not satisfy the original clearing condition, execution is allowed to be stopped and then restarted at another position. This permits the user to enjoy a part of an existing game program with adopting a different clearing condition. Further, a plurality of game programs are allowed to be combined to each other so that the user is allowed to easily enjoy various games.

Here, the execution flow and the game program may be read from the recording medium 2 through the recording medium attachment part 12 or alternatively from a server or the like on a network through the wireless communication part 16.

Further, judgment of the clearing condition has been performed by using the outputted image. Instead, the judgment may be performed by checking the memory or the like of the emulator. This is because, for example, the score value, the player stock number, and the like are usually held as given variables. The reason why an image is used in the present embodiment is to comprehensively treat a plurality of game programs. When the variables are to be checked, setup need be performed after variable definition is checked for each game program so that the memory addresses in which these variables are stored are checked. On the other hand, in the case of employing an image, condition setting is easily achieved when the screen image is acquired.

In the above-mentioned embodiment, the execution start position of the game program and the clearing condition of the game have been changed so that a new way of enjoying the game has been provided. Further, when control is added to the screen display, another new way of enjoyment is provided.

<Change of Color>

The color display is changed into gray scale display or sepia color display. This changes the impression provided from the screen to the player and hence provides a way of enjoyment different from conventional games.

A detailed method of implementation may be achieved by a well-known technique. For example, the following implementation may be employed. That is, the image drawn in the VRAM emulated by the emulator is rewritten. Further, the color palette of the emulator is rewritten so that an image whose color information has been changed is drawn by the VRAM of the emulator.

Alternatively, such methods of implementation may be employed that the image drawn by the VRAM of the game machine 1 is rewritten and that the color palette of the game machine 1 is rewritten.

<Restriction of Acting Region of Player Character>

In a role playing game or an adventure game, in one scene, the region where the player character is allowed to act is large. Thus, when the acting region is restricted, the game is allowed to be enjoyed more easily.

For example, a detailed method of implementation is as follows. In a game program, which variable holds the position coordinates of the main character is analyzed. Further, the region of the position coordinates where the main character is allowed to act when the acting region is restricted is determined. Then, during the execution of the game program on the emulator, the management program always acquires the position coordinates of the main character. On the basis of the acquired values, when the main character is likely to deviate from the acting region, the management program does not transfer to the emulator a movement command for the main character inputted by the player. Alternatively, the emulator is controlled such that the game program is inhibited from acquiring the movement command for the main character inputted by the player.

Further, when movement to somewhere else through a door and a secret passage is to be restricted, for example, the following processing may be performed in addition to the position of the player character. In association with the movement to somewhere else, image data providing a background, setting data for a new scene, and the like should be read. Such processing for the movement to somewhere else should be implemented by one or a plurality of subroutines. Thus, the management program rewrites the program expanded on the memory or the like of the emulator, such that even when the subroutine for the processing for the movement to somewhere else is called, the procedure is returned without performing the processing.

As described above, when the acting region of the player character is restricted, even a role playing game or an adventure game in which it takes relatively a long time to clear one scene is allowed to be provided to the player as a game allowed to be enjoyed more easily in a shorter time.

<Display Mask Processing>

When the processing of displaying a part alone of a game screen or alternatively of not displaying a part alone is employed, a new way of enjoyment is provided.

Exemplary implementation is as follows. That is, the output image drawn in the VRAM emulated by the emulator is rewritten. A bit pattern having the number of pixels similar to that of the output image is prepared. Bit 1 is imparted to a portion to be displayed and bit 0 is imparted to a portion not to be displayed. Then, logical multiplication is applied between the output image and the bit pattern. As a result, the portion to be displayed suffers no change and the portion not to be displayed becomes black so that a desired output image is obtained.

<Contour Enhancement Display of Object>

When the contours of objects such as a main character, an enemy character, and an item are enhanced, a new way of enjoyment is provided. When the contour of a character is enhanced, impression of external appearance is changed. Further, when the contour of the enemy character is enhanced, the player more easily recognizes the appearance of the enemy character and hence the difficulty level of the game can be lowered. Further, when the contour of an item is enhanced, the player more easily finds the item. Similarly, when the contour of a secret door, a secret passage, or the like is enhanced, the player more easily finds it and hence the difficulty level of the game can be lowered. As such, when the difficulty level of the game is lowered by employing contour enhancement, the player is allowed to easily enjoy the game.

Exemplary implementation is as follows. That is, when image data for a character, an item, or the like contained in the game program is rewritten into an image having undergone contour enhancement, contour enhancement is always achieved. Alternatively, when an image having undergone contour enhancement is prepared and then the pointer to the image to be used when read by the game program is rewritten, the image having undergone contour enhancement is displayed in place of the image of normal display.

<Expansion or Reduction of Entire Screen Image>

When the entire game screen image is expanded or reduced in display, a new way of enjoyment is provided. When expansion display is adopted, display of the characters is expanded so that persuasive power is enhanced but the displayed region becomes smaller. Further, when reduction display is adopted, a possibility arises that the characters become hard to be seen. However, the region displayed on the screen becomes larger and hence the entire game is more easily overviewed.

Exemplary implementation is as follows. That is, the output image drawn in the VRAM emulated by the emulator is rewritten. At each time that an output image is stored into the VRAM, the output image is rewritten into an expanded or reduced image and then the rewritten image is newly stored into the VRAM.

<Right-Left Inversion of Entire Screen Image>

When the entire game image is displayed in a right-left inverted manner, a new way of enjoyment is provided. For example, in a shooting game based on the movement of a character from right to left, movement from left to right becomes new basic movement. Thus, a different feeling of operation is provided to the player and hence a different way of enjoyment is provided.

An exemplary method of implementation is similar to the case of expansion or reduction. That is, at each time that an output image is stored into the VRAM, the output image is rewritten into an image having undergone right-left inversion and then the rewritten image is newly stored into the VRAM.

<Mosaic on Image>

When mosaic is applied on the image displayed on the screen, display whose external appearance becomes different is achieved. As such, when the enemy character becomes hard to be recognized and the items become hard to be distinguished, the game difficulty level can be raised.

A method of implementation is similar to that of the above-mentioned contour enhancement display. That is, when the image data of a character, an item, or the like contained in the game program is rewritten into a mosaic-processed image, mosaic display is always achieved. Alternatively, when an image having undergone mosaic processing is prepared and then the pointer to the image to be used when read by the game program is rewritten, the image having undergone mosaic processing is displayed in place of the image of normal display.

<Periodical Non-Display of Background>

The background of the game screen is periodically made non-displayed or displayed. As a result, in a game scene, the player becomes hard to recognize the position of the main character. Depending on the scene, the player may miss the direction in which the main character should go. Thus, the difficulty level of the game can be raised.

An exemplary method of implementation is similar to that of the contour enhancement display. That is, when the image data of the background image contained in the game program is rewritten into a transparent image of the same size, the background becomes non-displayed. When the background image is restored to the original, the background is displayed again. Alternatively, a transparent image of the same size as the background image may be prepared and then the pointer to the image to be used when read by the game program may be rewritten or restored. This allows the background to be non-displayed or displayed again.

<Non-Display of a Part of Characters>

A part of characters are made non-displayed. For example, when a part of enemy characters are made non-displayed, the player does not recognize the presence of them and loses the main character owing to the non-displayed enemy character. This can raise the difficulty level of the game.

An exemplary method of implementation is similar to the case of non-display of the background. That is, an image of the character to be made non-displayed and a transparent image of the same size are prepared. Then, the image data itself is rewritten or alternatively the pointer to the image to be used when read by the game program is rewritten.

<Change of Images of a Part of Characters>

The images of a part of characters are changed. For example, the enemy character image is made identical to the main character image operated by the player. In the course of fighting or the like, the player suffers confusion which one is the true main character operated by the player. This can raise the difficulty level of the game.

An exemplary method of implementation is similar to the case of non-display of a part of characters. That is, the image of the character to be changed is rewritten into the data of a changed image. Alternatively, the pointer to the image to be used when read by the game program is rewritten.

<Unbeatable Main Character>

The main character operated by the player is made unbeatable such that even when attacked by the enemy character, the main character is not killed. As a result, the player is allowed to continue enjoying the game until clearing.

An exemplary method of implementation is as follows. In the virtual memory used by the game program, a variable holding the value such as the HP (Hit Point) and the damage point representing the degree of received attack or damage in the main character is monitored. Then, when the value varies owing to a received attack, the processing of immediately recovering the value is performed.

<Fixed Input Through Given Key>

A state is established that a given key continuously generates input. This realizes a state that key input is generated even when the player does not operate the key. For example, in a case that when the given key is not operated for input, the main character moves at a velocity of walking and that when the given key is operated for input, the main character moves at a velocity of dash rather than walking, a state is established that the given key is continuously operated for input. As a result, the main character moves always in dash and hence the difficulty level of the game can be raised.

An exemplary method of implementation is as follows. That is, a state that the given key is operated for input is established by software in the emulator. Then, the game program executed on the emulator operates as if the given key is operated for input.

As described above, in the embodiment, since a game program is operated on an emulator, when the virtual memory of the emulator is operated, the game program is allowed to be operated in various modes. Thus, new ways of enjoying the game are provided to the player.

Here, the game machine 1 serving as the information processing apparatus has been in the form of a single apparatus. However, employable configurations are not limited to this. That is, individual parts of the function of the game machine 1 may be provided by a plurality of apparatuses and then these apparatuses may cooperate with each other so as to implement the entirety of the function described above.

In this specification, even for each element or the like described in the singular form by using an article "a" or "an", such elements in a plural number shall be not excluded.

In the game machine according to the embodiment, a game program under execution is terminated in accordance with a termination condition set forth outside the program rather than with a termination condition set forth inside the program. This provides ways of enjoyment different from those in existing game programs and permits games easily enjoyable by users.

What is claimed is:

1. A non-transitory recording medium recording an information processing program causing an information processing apparatus to operate as:
   a reading part reading a game program capable of being executed by any other information processing apparatus having a configuration different from that of the information processing apparatus and execution situation information indicating an execution situation at a given execution position of the game program;

an emulation part, by using the execution situation information, emulating the game program with starting at the given execution position;

a judgment part judging an execution situation of the game program to be emulated; and a changing part, when it is judged that the execution situation of the game program satisfies a condition set forth in advance, changing an execution status of the emulation part;

wherein the game implemented by the game program includes a plurality of scenes each having a respective beginning, the execution situation information is information representing a state, during play of the game, in a given scene of the plurality of scenes, and the emulation part executes processing with starting at a middle part of another of the plurality of scenes based on the execution situation information representing the state, during play of the game, in the given scene of the plurality of scenes.

2. The recording medium according to claim 1, wherein when it is judged that the condition is satisfied, the changing part stops the processing concerning the scene under emulation.

3. The recording medium according to claim 2, wherein the reading part further reads execution situation information corresponding to one scene different from the scene under emulation from among execution situation information in the execution position corresponding to the plurality of individual scenes of the game program, and the changing part causes the emulation part to stop the processing concerning the scene under execution and then causes the emulation part to execute processing concerning one scene different from the scene under emulation.

4. The recording medium according to claim 3, wherein the reading part reads execution situation information corresponding to one scene from among execution situation information concerning a plurality of the game programs.

5. The recording medium according to claim 1, wherein the execution situation information is a memory image of the entirety of a virtual memory used in emulation of the game program.

6. The recording medium according to claim 1, wherein the condition set forth in advance is whether the game has advanced to a situation set forth in advance and wherein the judgment part includes:

a matching part performing matching between an output image outputted by the game program executed by the emulation part and a judgment-use image set forth in advance; and an image judgment part, from the matching result obtained by the matching part, judges whether the game concerning the game program has advanced to a situation set forth in advance.

7. The recording medium according to claim 6, wherein the image judgment part, on the basis of the matching result, when the judgment-use image appears in the output image, judges that the execution situation of the game program satisfies the condition.

8. The recording medium according to claim 7, wherein the image judgment part, when the appearance position of the judgment-use image in the output image falls within a given region, judges that the execution situation of the game program satisfies the condition.

9. The recording medium according to claim 7, wherein the matching part repeatedly executes matching between the output image and the judgment-use image, and the image judgment part, when the appearance position of the judgment-use image in the output image has transited in a manner set forth in advance, judges that the execution situation of the game program satisfies the condition.

10. The recording medium according to claim 7, wherein the matching part repeatedly executes matching between the output image and the judgment-use image and then, at each time of executing the matching, acquires the number of appearing pieces of the judgment-use image in the output image or alternatively a numerical value contained in the output image and the image judgment part, when the number of appearing pieces of the judgment-use image in the output image or alternatively the numerical value satisfies a given condition, judges that the execution situation of the game program satisfies the condition.

11. The recording medium according to claim 10, wherein the situation that the given condition is satisfied indicates that the number of appearing pieces or the numerical value contained in the output image has suffered given change relative to the number of appearing pieces or the numerical value acquired by the preceding matching.

12. An information processing apparatus comprising:

a reader configured to read a game program capable of being executed by any other information processing apparatus having a configuration different from the own and execution situation information indicating an execution situation at a given execution position of the game program;

an emulator configured to emulate, by using the execution situation information, the game program with starting at the given execution position;

a judgment part configured to judge an execution situation of the game program to be emulated; and a changing part configured to change, when it is judged that the execution situation of the game program satisfies a condition set forth in advance, an execution status of the emulator; wherein a game implemented by the game program includes a plurality of scenes each having a respective beginning, the execution situation information is information representing a state, during play of the game, in a given scene of the plurality of the scenes, and the emulator is configured to execute processing with starting at a middle part of another of the plurality of scenes based on the execution situation information representing the state, during play of the game, in the given scene of the plurality of scenes.

13. A system comprising:

an information processing system, including a computer processor, the information processing system being configured at least to perform:

reading a game program capable of being executed by any other information processing system having a configuration different from the own and execution situation information indicating an execution situation at a given execution position of the game program;

emulating, by using the execution situation information, the game program with starting at the given execution position;

judging an execution situation of the game program to be emulated; and changing, when it is judged that the execution situation of the game program satisfies a condition set forth in advance, an execution status of the emulating; wherein a game implemented by the game program includes a plurality of scenes each having a respective beginning, the execution situation information is information representing a state, during play of the game, in a given scene of the plurality of scenes, and the emulating executes processing with starting at a middle part of another of the plurality of scenes based on the execution situation information representing the state, during play of the game, in the given scene of the plurality of scenes.

14. An information processing method to be executed by an information processing apparatus, comprising:

reading a game program capable of being executed by any other information processing apparatus having a configuration different from the own and execution situation information at a given execution position of the game program;

emulating the game program with starting at the given execution position by using the execution situation information;

judging the execution situation of the game program; and changing the execution status of the game program when it is judged that the execution situation of the game program satisfies a condition set forth in advance, wherein a game implemented by the game program includes a plurality of scenes each having a respective beginning, the execution situation information is information representing a state, during play of the game, in a given scene of the plurality of scenes, and the emulating includes executing processing with starting at a middle part of another of the plurality of scenes based on the execution situation information representing the state, during play of the game, in the given scene of the plurality of scenes.

* * * * *